L. F. BURKE.
INNER TUBE TESTER FOR PNEUMATIC TIRES.
APPLICATION FILED FEB. 4, 1921.

1,436,695. Patented Nov. 28, 1922.

Patented Nov. 28, 1922.

1,436,695

UNITED STATES PATENT OFFICE.

LEE F. BURKE, OF DETROIT, MICHIGAN.

INNER-TUBE TESTER FOR PNEUMATIC TIRES.

Application filed Feburary 4, 1921. Serial No. 442,435.

*To all whom it may concern:*

Be it known that I, LEE F. BURKE, a citizen of the United States, residing in the city of Detroit, county of Wayne, State of Michigan (whose post-office address is 133 Adams Ave. west), have invented certain new and useful Improvements in an Inner-Tube Tester for pneumatic tires, and declare the following to be a full, clear, and exact description of the same, such as will enable others skilled in the art to which it pertains to make and use the same, reference being had to the accompanying drawings, which form a part of these specifications.

The object of my invention is to provide a testing jacket, or case, for locating small holes in the inner air retaining tube of a pneumatic rubber tire, as is in common use on vehicles, such as cause a slow leak in the tire.

Another object is to provide a testing case which will allow the inner tube to be inclosed therein, and inflated, thus allowing it to be immersed in a tank of water, under high pressure, disclosing the small holes which are causing the slow leak, but which would be impossible to locate under a normal pressure.

A further object is to provide a testing case to prevent bulging or undue expansion of the tube when inflated to a high pressure.

A still further object is to provide a case that is simple in construction, easily and efficiently operated, and one that can be manufactured at a low cost.

These several objects are secured in their preferred form by the construction and arrangement of parts as are more fully hereinafter described.

Similar parts on all drawings are marked by similar numerals.

By the ordinary process now in use, the inner tube is inflated with air to a normal pressure and then immersed in a tank of water to locate the hole. Owing to the inability to inflate the tube only to a very low pressure, because of a possibility of bulging and bursting the tube, it is difficult to locate the small holes causing the slow leak in the tube.

My invention consists of a woven casing of shape similar to the outer casing of an automobile tire with an opening for inserting the tube, and means for holding and retaining the shape of the tube when inflated.

The apparatus is designed to protect the tube, and prevent any bulging due to weak spots in the tube walls, and allow it to be inflated to as great a pressure, if desired, as it is subjected to when in use on the vehicle, slightly stretching the tube walls, and opening the small holes thus locating the slow leak when immersed in a tank of water.

I will now describe more fully the detailed construction, and parts thereof, referring to the accompanying drawings and the marks thereon.

Figure 1:
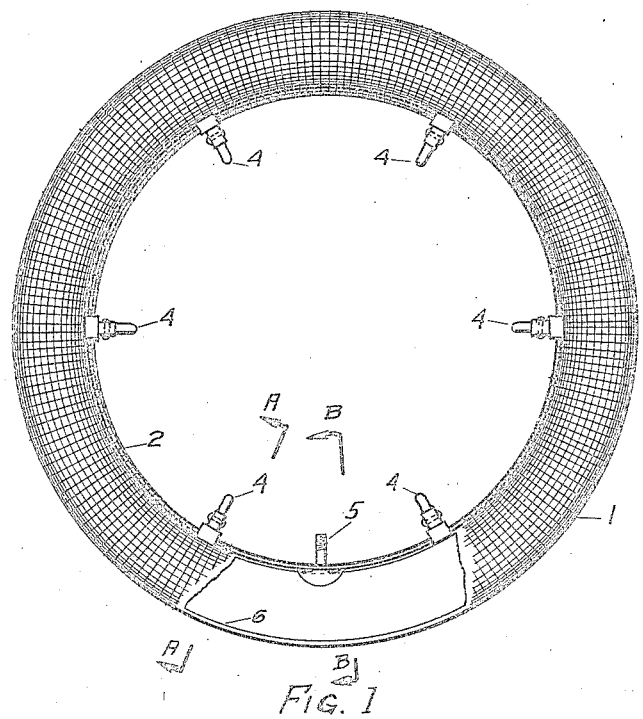
Fig. 1, is front view of the tube retainer case, showing the general construction and means for securely locking the walls when inflating the tube.
Figure 2:
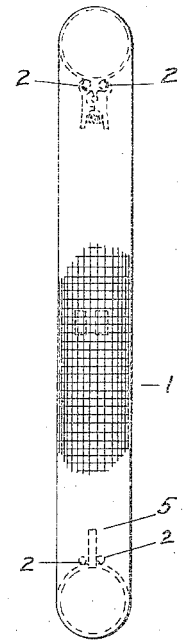
Fig. 2, is a side view of the retainer showing the arrangement of the walls.
Figure 3:
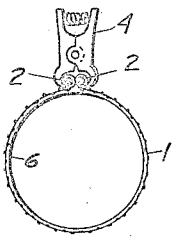
Fig. 3, is a sectional view —AA— showing the wall details and means for clamping the edges of the casing when inflating.
Figure 4:
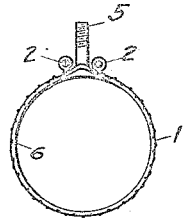
Fig. 4, is a sectional view —BB— showing the inner tube and valve stem as placed in the testing case.
Figure 5:
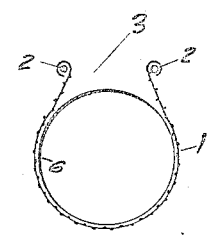
Fig. 5, is also a sectional view of the testing case in its opened position, to illustrate the means for inserting the tube before inflating.

The preferred form of construction of the testing case consists of a woven casing similar to the shape of an ordinary outer casing of an automobile tire, being of a circular form, and open on the inner side of the jacket for inserting the tire tube, and of a cross section to retain the shape of the tire tube 6 when inflated. The outer walls 1, may be built up of any woven material, either of wire or fabric, or of a perforated sheet, and preferably of a coarse weave or mesh. In building the walls 1, a woven wire screen to fit the tube 6 is the preferred form. The longitudinal wires run the entire length around the casing, while the cross wires form the cross section of the jacket and are fastened at either end to the reinforcing rings 2. The walls being stiff and rigid it retains its original shape at all times, and facilitates the handling of the frame, and in opening and entering the tube 6 for testing. The open meshes of the wires allow the free contact of the water in the immersing tank with the tube 6, and makes it easy to locate the hole causing the slow leak. The open meshes of the wire screen also allow for the marking of the hole as indicated by the water bubble, for repairing later when removed from the tester. However the casing 1 may be made of any woven material that can conform to the shape of the tube 6, with strength in the fabric sufficient to withstand the strain when the tube is inflated. The opening 3 on the inner side of the casing —1— is to allow the tube —6— to be inserted and removed from the testing case —1—. After placing the tube therein, the opening is closed by drawing the reinforcing rings —2— together as shown in Fig. 3, and fastening by means of clamps —4—. Any number of clamps may be used as are required to hold the rings together and free from bulging when under the pressure of the inflated tube —6—. These rings are slightly bent in one place to allow the valve stem —5— of the tube, to pass through the casing to avoid injury thereto and to provide for inflating the tube. After securely clamping the reinforcing rings —2— together, the tube may then be inflated to any desired pressure without danger of bulging or injury from undue expansion, and the whole frame immersed in a tank of water. The tube being under high pressure and the tire slightly expanded above the normal size, opens even the smallest holes in the tube walls and allows bubbles of air to pass freely from its surface, and locating all holes which may be then marked and the tube removed and repaired.

Having fully described my invention, its construction and the operation thereof, what I claim as my invention and desire to secure Letters Patent is:

1. In a single unit testing case of the character described, comprising a single retaining wall, edge reinforcing rings, means for inserting the tire tube, and means for retaining same therein.

2. In a single unit testing tube casing of the character described, comprising a single retaining wall having an inner wall opening, edge wall reinforcing rings, means for holding said rings in a closed position.

3. In a single unit tube testing case of the character described, comprising a single retaining wall having an inside wall opening, reinforcing edge rings, ring clamps and means for connecting and operating same.

In testimony whereof, I LEE F. BURKE, sign these specifications.

LEE F. BURKE.

Witnesses:
M. J. DIRKES,
L. H. DAVIS.